(12) United States Patent
Labuhn et al.

(10) Patent No.: US 7,719,410 B2
(45) Date of Patent: May 18, 2010

(54) THREAT ASSESSMENT STATE PROCESSING FOR COLLISION WARNING, MITIGATION AND/OR AVOIDANCE IN GROUND-BASED VEHICLES

(75) Inventors: Pamela I. Labuhn, Shelby Township, MI (US); Osman D. Altan, Northville, MI (US); Charles A. Green, Canton, MI (US); Uzmaa H. Balbale, Canton, MI (US); William J. Chundrlik, Jr., Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 341 days.

(21) Appl. No.: 11/620,752

(22) Filed: Jan. 8, 2007

(65) Prior Publication Data
US 2008/0167781 A1    Jul. 10, 2008

(51) Int. Cl.
  *B60Q 1/00*     (2006.01)
(52) U.S. Cl. ..................................... 340/435
(58) Field of Classification Search ................ 340/435, 340/436, 463, 901, 903; 701/301; 180/171
See application file for complete search history.

(56) References Cited

U.S. PATENT DOCUMENTS

| | | | | |
|---|---|---|---|---|
| 5,574,426 A | * | 11/1996 | Shisgal et al. | 340/435 |
| 5,714,927 A | * | 2/1998 | Henderson et al. | 340/435 |
| 5,864,285 A | * | 1/1999 | Wieder et al. | 340/435 |
| 6,169,478 B1 | * | 1/2001 | Hada et al. | 340/435 |
| 6,203,120 B1 | * | 3/2001 | Urai et al. | 303/125 |
| 6,433,679 B1 | * | 8/2002 | Schmid | 340/435 |
| 6,842,684 B1 | | 1/2005 | Kade et al. | |
| 7,027,920 B2 | * | 4/2006 | Madau | 701/301 |
| 7,036,621 B2 | * | 5/2006 | Takafuji et al. | 180/274 |
| 7,375,620 B2 | | 5/2008 | Balbale et al. | |
| 2005/0004760 A1 | | 1/2005 | Urai et al. | |

OTHER PUBLICATIONS

Balbale et al., U.S. Appl. No. 11/297,694, filed Dec. 8, 2005, "Speed-Sensitive Rear Obstacle Detection and Avoidance System," assigned to GM Global Technology Operations, Inc.

* cited by examiner

*Primary Examiner*—Phung Nguyen
(74) *Attorney, Agent, or Firm*—Ingrassia Fisher & Lorenz, P.C.

(57) ABSTRACT

A method and apparatus is provided for detecting and avoiding an obstacle using a system of a vehicle. The method includes the steps of detecting a distance between the obstacle and the vehicle, generating an action when the distance between the obstacle and the vehicle is less than a threshold, determining whether an override of the system has been initiated, and disabling the action if it is determined that the override has been initiated. The system includes an obstacle detector, an action generator, an override mechanism, and a processor configured to implement the steps of the method set forth above.

6 Claims, 4 Drawing Sheets

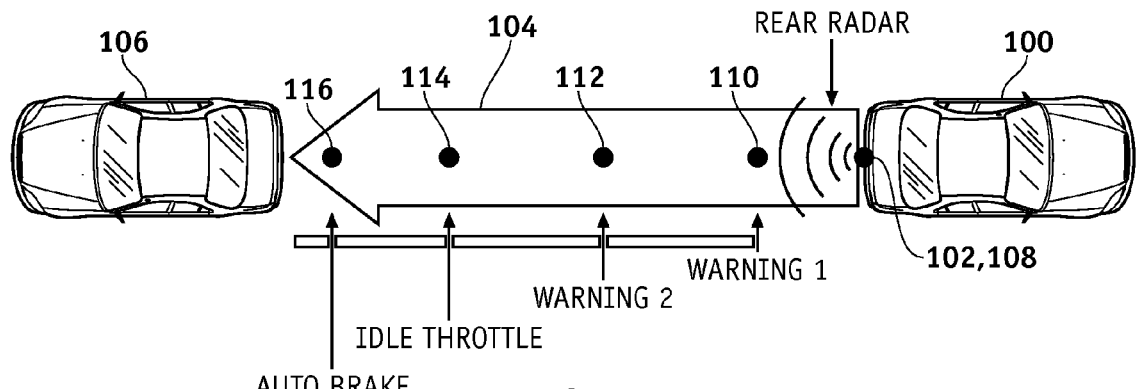
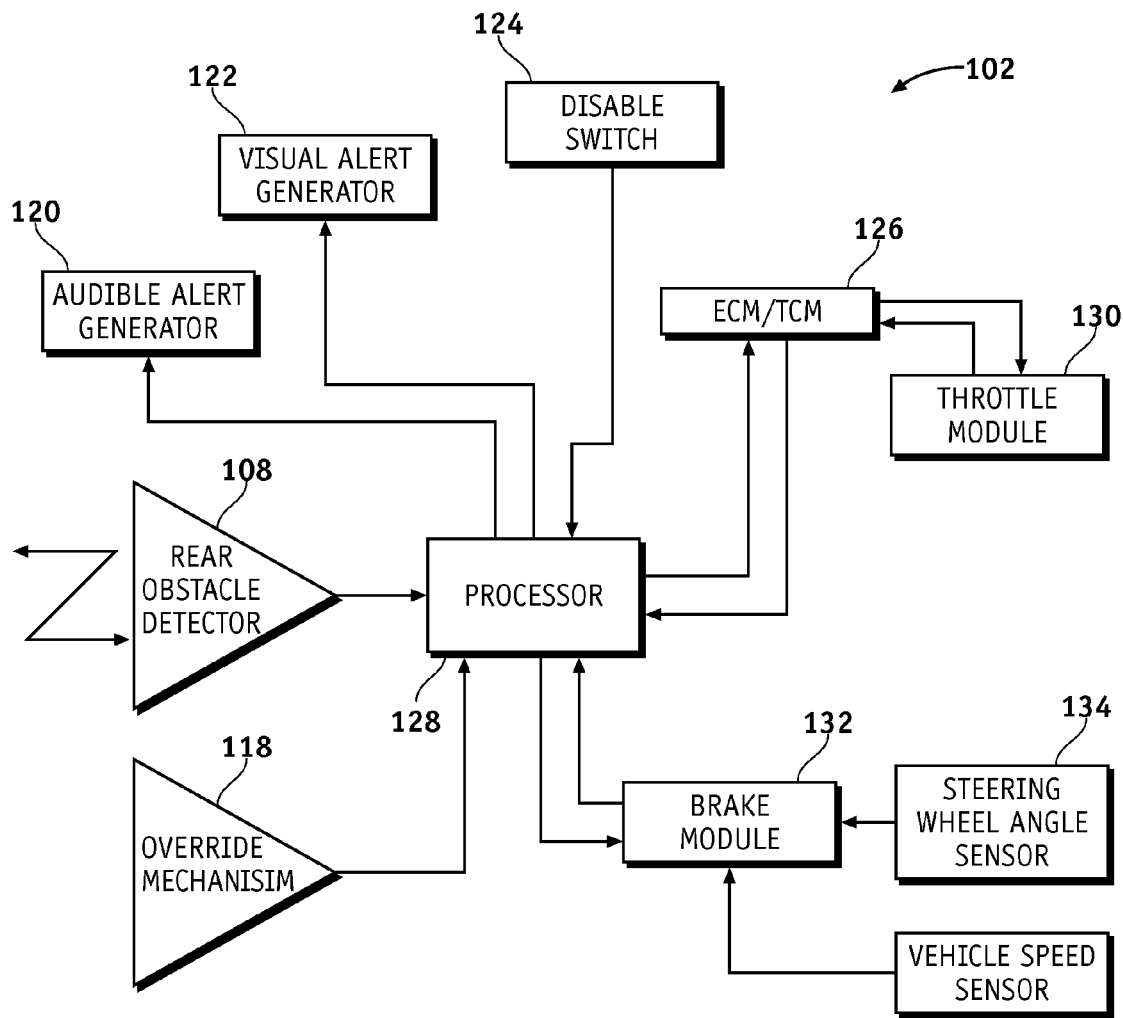

THREAT ASSESSMENT STATE TRANSITION CONDITIONS /200

| TRANSITION NUMBER | CONDITION ASSOCIATED WITH TRANSITION |
|---|---|
| 1 | System Enabled AND Warning 1 Not Given for this Object AND (Warning 2 Threshold < Distance ≤ Warning 1 Threshold) |
| 2 | System Enable AND Disance ≤ Warning 2 Threshold |
| 3 | System Enabled AND No Override AND Distance ≤ Idle Throttle Threshold |
| 4 | System Enabled AND No Override AND Distance ≤ Apply Brakes Threshold |
| 5 | System Enabled AND No Override AND Vehicle Stopped |
| 6 | System Disabled OR Override OR No Object OR Distance > Idle Throttle Threshold OR Driver Presses Brake Pedal To Keep Vehicle Stopped |
| 7 | System Disabled OR Override OR No Object OR Distance > Idle Throttle Threshold |
| 8 | Control Released AND (System Disabled OR No Object OR Distance > Warning 2 Threshold) |
| 9 | System Disabled OR No Object OR Warning 1 Given |
| 10 | System Disabled OR No Object OR Distance > Warning 2 Threshold |

FIG. 4

THREAT ASSESSMENT STATE PROCESSING FOR COLLISION WARNING, MITIGATION AND/OR AVOIDANCE IN GROUND-BASED VEHICLES

TECHNICAL FIELD

The present invention relates generally to a vehicular obstacle detection and avoidance system and method and, more particularly, to an obstacle detection and avoidance system and method for notifying a driver of obstacles and the likelihood of collision therewith over a range of speeds and distances.

BACKGROUND OF THE INVENTION

In most circumstances, the driver of a vehicle (e.g., a car, truck, SUV, or other vehicle) has adequate visibility to permit the safe operation of his or her vehicle. Despite this, however, drivers commonly encounter situations in which their ability to see the vehicle's path and obstacles within the vehicle's path may be less than perfect.

A variety of obstacle detection and avoidance ("ODA") systems have been developed that alert a driver to obstacles near or within the vehicle's projected path and thereby minimize the likelihood of collision. For example, ODA systems may employ a camera and one or more sensors (e.g., infrared, ultrasonic, or radar sensors, or any combination thereof) that monitor the vehicle's path and alert the driver to any obstacles detected therein by producing audible and visual alerts. However, it may be preferable in some instances to provide additional warnings or other measures, and/or to allow the driver to override such an ODA system.

Accordingly, it is desirable to provide an obstacle detection and avoidance system configured to effectively alert a driver of an obstacle and the likelihood of collision therewith, and that can allow drivers to override the system in certain situations. Furthermore, other desirable features and functions of the present invention will become apparent from the subsequent detailed description of the invention and the appended claims, taken in conjunction with the accompanying drawings and this background of the invention.

SUMMARY OF THE INVENTION

A method is provided for detecting and avoiding an obstacle using a system of a vehicle. In one embodiment, and by way of example only, the method comprises the steps of detecting a distance between the obstacle and the vehicle, generating an action when the distance between the obstacle and the vehicle is less than a threshold, determining whether an override of the system has been initiated, and disabling the action if it is determined that the override has been initiated.

In another embodiment, and by way of example only, the vehicle includes brakes and a powertrain, and the method comprises detecting a distance between the obstacle and the vehicle, reducing power from the powertrain when the distance between the obstacle and the vehicle is less than a first threshold, applying the brakes when the distance between the obstacle and the vehicle is less than a second threshold, determining whether an override of the system has been initiated, and at least performing one of restoring power from the powertrain and disabling the application of the brakes if it is determined that the override has been initiated.

An apparatus is provided for a system of a vehicle for detecting and avoiding an obstacle. In one embodiment, and by way of example only, the system comprises an obstacle detector, an action generator, an override mechanism, and a processor. The obstacle detector is coupled to the vehicle, and is configured to detect a distance between the obstacle and the vehicle. The action generator is configured to generate an action. The override mechanism is configured to at least facilitate determining whether an override has been initiated. The processor is coupled to the obstacle detector, the action generator, and the override mechanism, and is configured to (i) command the action generator to generate the action when the distance between the obstacle and the vehicle detected by the obstacle detector is less than a threshold, and (ii) disable the generated action when it is determined that the override has been initiated.

DESCRIPTION OF THE DRAWINGS

The present invention will hereinafter be described in conjunction with the following drawing figures, wherein like numerals denote like elements, and FIG. 1 provides a top view of a vehicle equipped with an exemplary embodiment of an obstacle detection and avoidance system;

FIG. 2 provides a functional block diagram of the obstacle detection and avoidance system of FIG. 1;

FIG. 4 depicts an exemplary embodiment of various transition conditions associated with the condition states of FIG. 3.

DESCRIPTION OF AN EXEMPLARY EMBODIMENT

Figure 3:
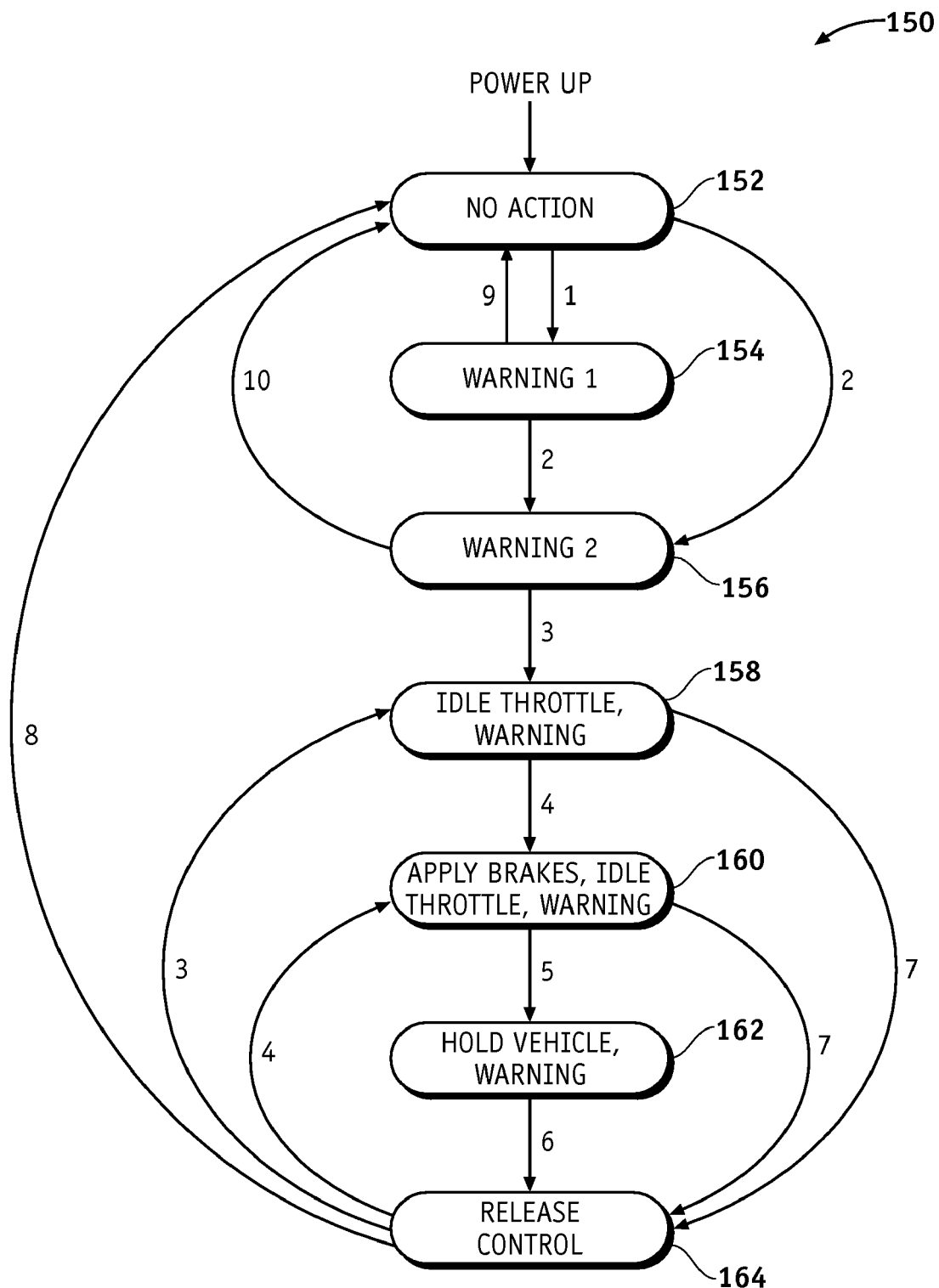
FIG. 3 depicts an exemplary embodiment of a processing method for utilizing the obstacle detection and avoidance system of FIG. 2, by depicting various condition states associated with the processing method.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 1 provides an overhead view of a vehicle 100, equipped with an exemplary embodiment of an obstacle detection and avoidance (ODA) system 102, and traveling upon a path 104 in proximity to an obstacle 106. The ODA system 102 of the vehicle 100 is equipped with one or more obstacle detectors 108 for monitoring one or more specified detection fields behind the vehicle 100 by, for example, transmitting pulses (e.g., infrared, ultrasonic, or radar) and receiving pulses reflected back from one or more obstacles 106. In other embodiments, the obstacle detectors 108 can be placed in front of, and/or in other parts of, the vehicle 100. The obstacle detector 108 may comprise both ultrasonic and radar sensors, or the detector may comprise solely radar sensors capable of producing a relatively far detection field while simultaneously accurately detecting obstacles 106 that are relatively close to the vehicle 100.

As depicted in FIG. 1, the obstacle detector 108 may be disposed in the rear of the vehicle 100. However, it will be appreciated that the obstacle detector 108 may also be disposed in any of a number of other different locations on the vehicle 100. It will similarly be appreciated that the obstacle 106 may be another vehicle (as depicted in FIG. 1), or any one of a number of different types of objects.

FIG. 1 also depicts illustrative points along the path 104 at which the ODA system 102 can perform various obstacle avoidance actions when the vehicle 100 is traveling in proximity to an obstacle 106 at points 110, 112, 114, and 116 along path 104. As shown in FIG. 1, first, second, third, and fourth obstacle avoidance actions may be performed at points 110, 112, 114, and 116, respectively, when the vehicle 100 is traveling along path 104.

For example, in FIG. 1, the ODA system 102 may be configured to issue a cautionary alert at point 110, which may include a visual alert (e.g., a flashing yellow light generated by a display mounted proximate the vehicle's rear windshield) and/or an audible alert (e.g., a brief chime-like tone). In a preferred embodiment, the audible alert may sound only once, and the visual alert may continue until the vehicle 100 reaches point 112. At this point an imminent alert may be generated, the imminent alert, preferably including a new visual alert (e.g., a flashing red light also appearing on the display mounted proximate the vehicle's rear windshield), a new audible alert (e.g., a repeating chime-like tone), and/or a haptic alert (e.g., a seat vibration or a brief application of the brake, referred to as a brake pulse, which may be felt by the driver and other passengers).

Next, when the vehicle 100 reaches point 114, the ODA system 102 may be configured to disengage the throttle and/or to otherwise reduce power from the powertrain, so as to decrease the velocity, and/or prevent an increase in velocity, of the vehicle 100. It will be appreciated that in various different types of vehicles 100, for example with different types of powertrains, the power may be reduced from the powertrain in various different manners, accordingly. Next, when the vehicle 100 reaches point 116, the ODA system 102 may be configured to apply sufficient braking to prevent a collision with the obstacle 106. Additionally, the ODA system 102 may be configured to disable one or more of the obstacle avoidance actions if it is determined that the driver is attempting to override the ODA system 102.

It will be appreciated that FIG. 1 and the description thereof is only an example of a warning and avoidance scheme that may be utilized in accordance with the ODA system 102. It will similarly be appreciated that similar or different warning and avoidance schemes may be used depending on the speed of the vehicle 100, various environmental and/or other conditions, and/or whether the vehicle 100 is traveling forward or in reverse. It will similarly be appreciated that the ODA system 102 can utilize any of numerous different obstacle avoidance actions, and/or combinations thereof, to suit a variety of situations and embodiments.

FIG. 2 provides a functional block diagram of an ODA system 102 in accordance with an exemplary embodiment of the present invention. The ODA system 102 preferably comprises the above-mentioned obstacle detector 108, an override mechanism 118, an audible alert generator 120 (e.g., a chime module), a visual alert generator 122 (e.g., a rear display), a disable switch 124, an engine and transmission control module (ECM/TCM) 126, a processor 128, a throttle module 130 preferably part of an Electronic Throttle Control system controlled by the ECM/TCM 126, a brake system or brake module 132, a steering wheel angle sensor 134, and a vehicle speed sensor 136.

As shown in FIG. 2, the processor 128 preferably has first, second, third, fourth, and fifth inputs coupled to the outputs of the obstacle detector 108, the override mechanism 118, the disable switch 124, the ECM/TCM 126, and the brake module 132, respectively. The processor 128 also preferably includes first, second, third, and fourth outputs coupled to the inputs of the audible alert generator 120, the visual alert generator 122, the ECM/TCM 126, and the brake module 132, respectively. The brake module 132 preferably has first, second, and third inputs coupled to the outputs of the processor 128, the steering wheel angle sensor 134, and the vehicle speed sensor 136, respectively. The ECM/TCM 126 preferably has first and second inputs coupled to the outputs of the processor 128 and the throttle module 130.

Though not shown in FIG. 2, a rearward looking camera, and/or another type of camera, may also be included in the ODA system 102. The camera may be coupled to the processor 128 and a display and provide a driver of vehicle 100 with images of the rearward path of the vehicle 100, and/or other images. Such a camera may further increase the likelihood that a driver will take appropriate actions to avoid a collision with an obstacle.

The ODA system 102 preferably utilizes data indicating (i) the distance at which obstacles 106 are detected by the obstacle detector 108; (ii) the current speed of the vehicle, determined by the vehicle speed sensor 136; (iii) the gear in which the vehicle is presently operating, determined from the ECM/TCM 126; (iv) whether the ODA system 102 is enabled (i.e., whether the ODA system 102 is switched on), determined from the disable switch 124; and (v) whether the driver is attempting to override the ODA system 102 (e.g., if the driver is applying the brakes or the accelerator pedal of the vehicle 100), determined at least in part from the override mechanism 118. Preferably the override mechanism 118 includes one or more sensors and/or other devices configured to at least facilitate the determination as to whether or not the driver is attempting a system override. For example, in some embodiments the override mechanism 118 may itself determine whether or not the driver is attempting a system override, while in other embodiments the override mechanism 118 may provide information to the processor 128 to facilitate making this determination.

The above information is processed in accordance with one or more functions of at least speed and distance to determine which, if any, obstacle avoidance actions should be taken. The processor 128 may also utilize the current position of the steering wheel (e.g., as indicated by steering wheel angle sensor 134) and any other relevant data (e.g., vehicle yaw rate) to determine one or more projected paths of the vehicle 100 to be monitored for obstacles 106 by the obstacle detector 108.

FIG. 3 depicts an exemplary embodiment of a processing method 150 utilizing the ODA system 102. Specifically, FIG. 3 depicts various condition states associated with the processing method 150, namely a No Action state 152, a Warning 1 state 154, a Warning 2 state 156, an Idle Throttle, Warning state 158, an Apply Brakes, Idle Throttle, Warning state 160, a Hold Vehicle state 162, and a Release Control state 164. Each of these condition states 152-160 has a threshold distance, such that, when the distance between the vehicle 100 and the obstacle 106 is less than the particular threshold distance for a particular condition state, such particular condition state is implemented. The threshold distances may each depend on any of a number of different possible factors, including, by way of example only, the speed of the vehicle 100, the speed of the obstacle 106, the acceleration of the vehicle 100, the relative velocity of the obstacle 106, the type of vehicle 100, including brake and throttle characteristics, the type of obstacle 106, weather conditions and/or other environmental conditions, and/or any of a number of other possible factors. Preferably, the threshold distances are a function of at least the vehicle 100 speed. In addition, it may also be desirable to incorporate hysteresis with respect to the threshold distances to avoid unwanted movement back and forth between condition states potentially based on measurement noise.

The transition between the condition states 152-164 is governed by various criteria, denoted in FIGS. 3 and 4 as Transition Numbers 1-10, and described in detail in FIG. 4. As set forth in FIG. 4, the Transition Numbers 1-10 are dependent at least in part on the threshold distances for the particular condition states 152-164. The exemplary embodiment of the processing method 150 from FIGS. 3 and 4 will now be discussed in greater detail below.

Once the ODA system 102 is powered up, it begins in the No Action condition state 152. While in the No Action state 152, the ODA system 102 provides no warnings and no control. The ODA system 102 will remain in the No Action state 152 until the conditions to transition either to the Warning 1 state 154 (denoted as Transition Number 1 in FIG. 4) or to the Warning 2 state 156 (denoted as Transition Number 2 in FIG. 4) are satisfied. For example, the ODA system 102 will remain in the No Action state 152 if the ODA system 102 is disabled, preferably via the disable switch 124, for example by the driver (through manipulating a switch, selecting from a menu, or some other means), or by the ODA system 102 on its own if certain diagnostic conditions are met.

In a preferred embodiment, the ODA system 102 proceeds to the Warning 1 state 154 from the No Action state 152, if each of the following conditions (Transition Number 1) are satisfied: (i) the ODA system 102 is enabled; (ii) the alert associated with the Warning 1 state 154 has not yet been provided; and (iii) the distance to the obstacle 106 is less than or equal to the Warning 1 threshold but greater than the Warning 2 threshold. Alternatively, the ODA system 102 proceeds to the Warning 2 state 156 from the No Action state 152, if both of the following conditions (Transition Number 2) are satisfied: (i) the ODA system 102 is enabled; and (ii) the distance to the obstacle 106 is less than or equal to the Warning 2 threshold.

While in the Warning 1 state 154, the driver is alerted to the presence of the obstacle 106 being approached. The Warning 1 alert is preferably a momentary alert such as one audible beep, generated by the audible alert generator 120 via instructions provided by the processor 128. However, in certain embodiments, the Warning 1 alert can be continuous rather than momentary. It will be appreciated that the Warning 1 alert may differ depending on whether the vehicle 100 is in reverse or traveling forward, and/or depending on the speed of the vehicle 100, and/or any one or more of a number of different factors. It will also be appreciated that in certain embodiments, the Warning 1 alert can be eliminated. The ODA system 102 remains in the Warning 1 state 154 until the conditions to transition either to the No Action state 152 (denoted as Transition Number 9 in FIG. 4) or to the Warning 2 state 156 (Transition Number 2) are satisfied.

In a preferred embodiment, the ODA system 102 proceeds from the Warning 1 state 154 back to the No Action state 152 if any of the following conditions (Transition Number 9) are satisfied: (i) the ODA system 102 is disabled; (ii) there is no longer an obstacle 106 present; or (iii) the Warning 1 alert has already been provided. In such a preferred embodiment, once the momentary alert is provided, the ODA system 102 proceeds back to the No Action state 152, unless the conditions to transition to the Warning 2 state 156 (Transition Number 2) are satisfied. Alternatively, the ODA system 102 proceeds from the Warning 1 state 154 directly to the Warning 2 state 156 if both of the following conditions (Transition Number 2) are satisfied: (i) the ODA system 102 is enabled; and (ii) the distance to the obstacle 106 is less than or equal to the Warning 2 threshold. It will be appreciated that in other embodiments the conditions may vary. For example, in certain embodiments the ODA system 102 can remain in the Warning 1 state 154, without transitioning back to the No Action state 152, until the conditions for transferring to the Warning 2 state 156 (Transition Number 2) are satisfied.

While in the Warning 2 state 156, the driver is warned about the obstacle 106 being approached. This warning is intended to be more urgent than the Warning 1 alert, and is preferably generated by the audible alert generator 120 and/or the visual alert generator 122 via instructions provided by the processor 128. It will be appreciated that the types of warning(s) used for the Warning 2 state 156 may differ depending on whether the vehicle 100 is in reverse or traveling forward, the speed of the vehicle 100, and/or any one or more of a number of different factors. The ODA system 102 remains in the Warning 2 state 156 until the conditions to transition either to the No Action state 152 (denoted as Transition Number 10 in FIG. 4) or to the Idle Throttle, Warning state 158 (denoted as Transition Number 3 in FIG. 4) are satisfied.

In a preferred embodiment, the ODA system 102 proceeds from the Warning 2 state 156 to the Idle Throttle, Warning state 158, if each of the following conditions (Transition Number 3) are satisfied: (i) the ODA system 102 is enabled; (ii) the driver is not overriding the ODA system 102; and (iii) the distance to the obstacle 106 is less than or equal to the Idle Throttle threshold. Alternatively, the ODA system 102 proceeds from the Warning 2 state 156 back to the No Action state 152, if any of the following conditions (Transition Number 10) are satisfied: (i) the ODA system 102 is disabled; (ii) there is no longer an obstacle; or (iii) the distance to the obstacle 106 is greater than the Warning 2 threshold.

While in the Idle Throttle, Warning state 158 (hereafter referred to as the "Idle Throttle state 158"), the throttle is idled to reduce the engine torque, using the throttle module 130, preferably via instructions provided by the processor 128. As mentioned above, this may also be accomplished by reducing power from the powertrain in various different manners corresponding with various different types of vehicles 100. Preferably, the warning associated with the Warning 2 state 156 continues in the Idle Throttle state 158. The ODA system 102 remains in the Idle Throttle state 158 until the conditions to transition either to the Apply Brake, Idle Throttle, Warning state 160 (denoted as Transition Number 4 in FIG. 4) or to the Release Control state 164 (denoted as Transition Number 7 in FIG. 4) are satisfied.

In a preferred embodiment, the ODA system 102 proceeds from the Idle Throttle state 158 to the Apply Brakes, Idle Throttle, Warning state 160, if each of the following conditions (Transition Number 4) are satisfied: (i) the ODA system 102 is enabled; (ii) the driver is not overriding the ODA system 102; and (iii) the distance to the obstacle 106 is less than or equal to the Apply Brakes threshold. Alternatively, the ODA system 102 proceeds from the Idle Throttle state 158 to the Release Control state 164 if any of the following conditions (Transition Number 7) are satisfied: (i) the ODA system 102 is disabled; (ii) the driver is overriding the ODA system 102; (iii) there is no longer an obstacle; or (iv) the distance to the obstacle 106 is greater than the Idle Throttle threshold.

While in the Apply Brakes, Idle Throttle, Warning state 160 (hereafter referred to as the "Apply Brakes state 160"), the throttle is idled and automatic braking is applied by the brake module 132, preferably via instructions provided by the processor 128, to stop the vehicle. The warning associated with the Warning 2 state 156 preferably continues in the Apply Brakes state 160. The ODA system 102 remains in the Apply Brakes state 160 until the conditions to transition either to the Hold Vehicle, Warning state 162 (denoted as Transition Number 5 in FIG. 4) or to the Release Control state 164 (Transition Number 7) are satisfied.

In a preferred embodiment, the ODA system 102 proceeds from the Apply Brakes state 160 to the Hold Vehicle, Warning state 162 if each of the following conditions (Transition Number 5) are satisfied: (i) the ODA system 102 is enabled; (ii) the driver is not overriding the ODA system 102; and (iii) the vehicle has stopped. Alternatively, the ODA system 102 proceeds from the Apply Brakes state 160 to the Release Control state 164 if any of the following conditions (Transition Number 7) are satisfied: (i) the ODA system 102 is disabled; (ii) the driver is overriding the ODA system 102; (iii) there is no longer an obstacle; or (iv) the distance to the obstacle 106 is greater than the Idle Throttle threshold.

While in the Hold Vehicle, Warning state 162 (hereafter referred to as the "Hold Vehicle state 162"), the ODA system 102 will preferably keep the vehicle stopped and continue the warning associated with the Warning 2 state 156. For example, the brake module 132 may keep the vehicle stopped. In addition, in certain types of vehicles 100, one or more commands may be sent to shift the vehicle into park mode, for example via an electronic park brake. With respect to the continued use of the Warning 2 in the Hold Vehicle, Warning state 162, in certain embodiments, a different warning may be used in the Hold Vehicle state 162, for example, by eliminating an audible portion (if there is one) of the warning associated with the Warning 2 state 156. The ODA system 102 remains in the Hold Vehicle state 162 until the conditions to transition to the Release Control state 164 (denoted as Transition Number 6 in FIG. 4) are satisfied.

In a preferred embodiment, the ODA system 102 proceeds from the Hold Vehicle state 162 to the Release Control state 164 if any of the following conditions (Transition Number 6) are satisfied: (i) the ODA system 102 is disabled; (ii) there is no longer an obstacle; (iii) the distance to the obstacle 106 is greater than the Idle Throttle threshold; (iv) the driver presses the brake pedal to keep the vehicle stopped; or (v) the driver is taking some other action attempting to override the ODA system 102, for example by applying the accelerator pedal. However, in certain embodiments, the criteria for transitioning from the Hold Vehicle state 162 to the Release Control state 164 may differ. For example, in certain embodiments, the ODA system 102 may automatically transition from the Hold Vehicle state 162 to the Release Control state 164 after a certain (preferably short) period of time. As another example, in various other embodiments, the ODA system 102 may not transition from the Hold Vehicle state 162 to the Release Control state 164 when there is no longer an obstacle and/or when the distance to the obstacle 106 is greater than the Idle Throttle threshold.

While in the Release Control state 164, automatic braking is released and throttle control is returned to what it would be without the ODA system 102, such as the amount of throttle requested by the driver through the accelerator pedal. As mentioned above, this can also be accomplished by restoring power from the powertrain in various different manners corresponding with different types of vehicles 100. The ODA system 102 remains in the Release Control state 164 until the conditions to transition to the Idle Throttle state 158 (Transition Number 3), to the Apply Brakes state 160 (Transition Number 4), or to the No Action state 152 (denoted as Transition Number 8 in FIG. 4) are satisfied.

Preferably, the particular implementation of the Release Control state 164 will depend at least in part on what the driver and vehicle are doing while in this state. For example, if the driver is attempting to override the ODA system 102, for example by pressing the accelerator pedal, then the automatic braking may be released more slowly than if the driver were pressing the brake pedal to hold the vehicle 100 at a stop. It will also be appreciated that the speed in which the automatic braking may be released when the driver is pressing the brake pedal may depend on the type of brake module 132 in the vehicle 100, among any of a number of other possible factors.

The ODA system 102 proceeds from the Release Control state 164 to the Idle Throttle state 158 if each of the following conditions (Transition Number 3) are satisfied: (i) the ODA system 102 is enabled; (ii) the driver is not overriding the ODA system 102; and (iii) the distance to the obstacle 106 is less than or equal to the Idle Throttle threshold. Alternatively, the ODA system 102 proceeds from the Release Control state 164 to the Apply Brakes state 160 if each of the following conditions (Transition Number 4) are met: (i) the ODA system 102 is enabled; (ii) the driver is not overriding the ODA system 102; and (iii) the distance to the obstacle 106 is less than or equal to the Apply Brakes threshold. Alternatively, the ODA system 102 proceeds from the Release Control state 164 to the No Action state 152 under the following circumstances (Transition Number 8); namely, if both (i) the control has been released; and (ii) at least one of the following additional conditions are satisfied: (a) the ODA system 102 is disabled; (b) there is no obstacle 106; or (c) the distance to the obstacle 106 is greater than the Warning 2 threshold.

In certain embodiments, a warning may be desired while in the Release Control state 164 depending on what the driver is doing while in this state. For example, if the ODA system 102 is enabled and the driver is overriding the ODA system 102, a warning may be appropriate if the vehicle 100 is still close to an obstacle 106.

Moreover, in certain embodiments the ODA system 102 may transition to the Release Control state from one or more other states (e.g., the Apply Brakes state 160 and/or the Hold Vehicle state 162) if automatic braking is applied when a diagnostic condition becomes active. For example, in certain embodiments, if the vehicle 100 is automatically braking to a stop and diagnostics determine that the obstacle detector 108 is not performing in accordance with certain reliability standards, then braking may be continued for a period of time while warning the driver that he or she needs to take over control of the vehicle 100.

Figure 5:
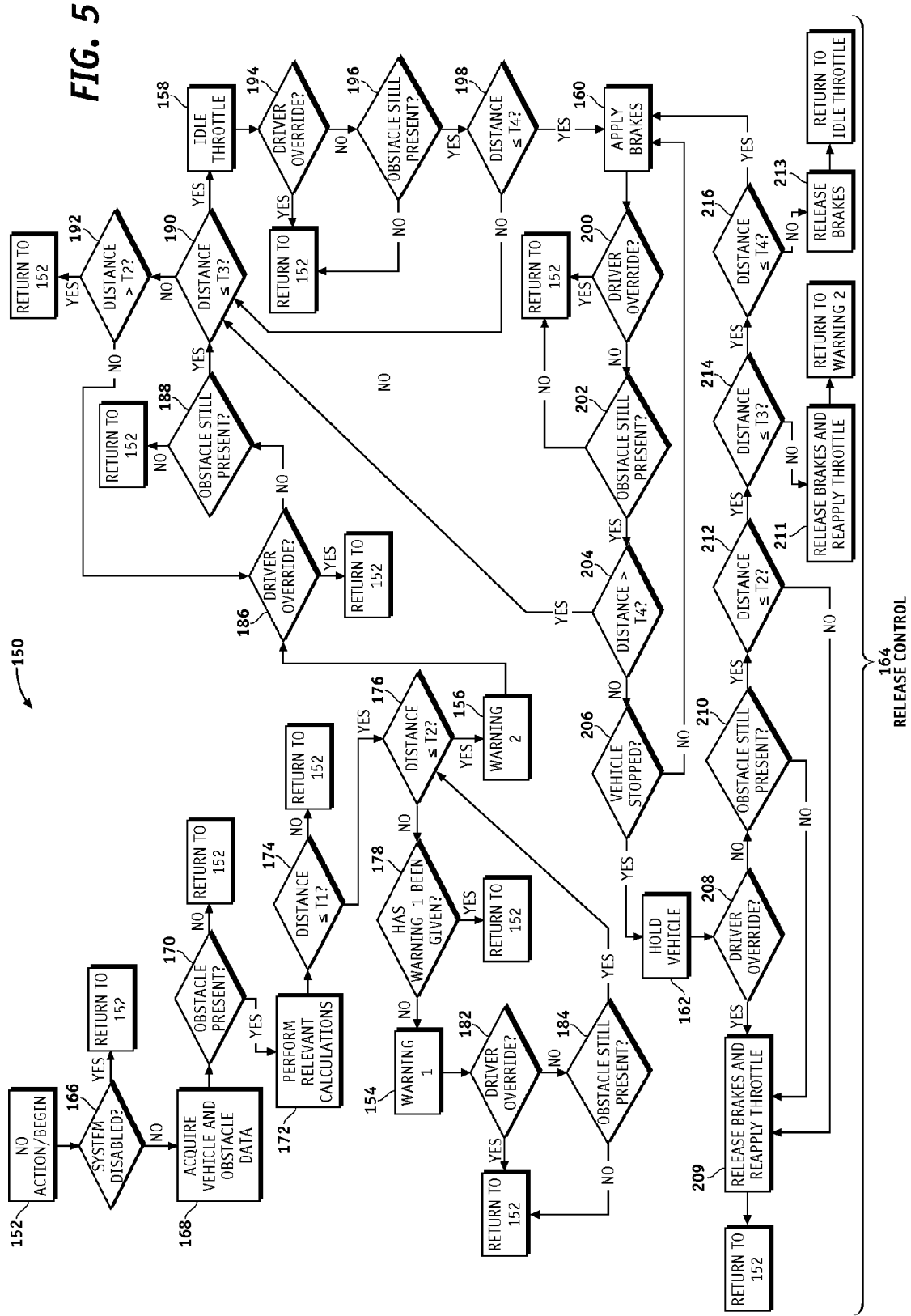
FIG. 5 depicts a flowchart of various steps of an exemplary embodiment of the processing method of FIG. 3.

FIG. 5 depicts a flowchart of various steps of an exemplary embodiment of the processing method 150 of FIGS. 3 and 4. First, the ODA system 102 begins in the No Action state 152, as set forth above. Next, in step 166, it is determined whether or not the ODA system 102 has been disabled. If it is determined that the ODA system 102 has been disabled, then the method proceeds with the ODA System 102's return to the No Action 152 state and the method begins again—otherwise, the method proceeds to step 168. In step 168, data is obtained pertaining to the vehicle 100 and the obstacle 106, and/or pertaining to weather or other environmental conditions or other potential factors, for example using the obstacle detector 108, the steering wheel angle sensor 134, and/or the vehicle speed sensor 136, and/or one or more other different sensors or other devices.

Next, in step 170, it is determined whether or not an obstacle 106 is present in proximity to the vehicle 100. If it is determined in step 170 that there is no obstacle 106, then the method proceeds with the ODA System 102's return to the No Action 152 state and the method begins again—otherwise, the method proceeds to step 172.

In step 172, relevant values, such as those pertaining to the vehicle 100 speed, the obstacle 106 speed, and the distance between the vehicle 100 and the obstacle 106, are calculated, preferably at least in part by the processor 128. Preferably, at least steps 168 and 172 are continuously performed, such that the relevant data, values, and calculations are real-time or as close thereto as possible. The current distance between the vehicle 100 and the obstacle 106, as repeatedly and preferably continuously measured through the duration of the processing method 150, shall hereafter be referred to as the "Distance".

It will be appreciated that in certain embodiments these and/or other values may be calculated based also in part upon the type of vehicle 100, the type of obstacle 106, the weather and/or other environmental conditions, and/or any of other possible factors. It will also be appreciated that, in the case that one or more obstacles 106 are detected, the calculations in step 172 may differ in various embodiments. In a preferred embodiment, the most imminent obstacle 106 is used for the calculations in step 172.

Next, in step 174, the Distance is compared with a first threshold (depicted as "T1" in FIG. 5), namely the above-described Warning 1 threshold. If the Distance is greater than the Warning 1 threshold, then the method proceeds with the ODA System 102's return to the No Action 152 state and the method begins again. Otherwise, the method proceeds to step 176, in which the Distance is compared with a second threshold (depicted as "T2" in FIG. 5), namely, the above-described Warning 2 threshold. Preferably, these and the other referenced comparisons between the (preferably continually measured) Distance and the various threshold distances are continually performed and updated, based on the latest measurements of the Distance and/or other pertinent information, so that the comparisons are real-time or as close thereto as possible. In addition, in various embodiments the various threshold distances may also be continually calculated and/or updated based on new or updated measurements and/or other information.

If it is determined in step 176 that the Distance is greater than the Warning 2 threshold, then, in step 178, it is determined whether the Warning 1 state 154 alert has already been provided. If it is determined in step 178 that this alert has already been provided, then the method proceeds with the ODA System 102's return to the No Action 152 state and the method begins again—otherwise, the ODA system 102 proceeds to the above-described Warning 1 state 154, in which the Warning 1 state 154 alert is provided, preferably by the audio alert generator 120 and/or the visual alert generator 122 via instructions provided by the processor 128. Then, in step 182, it is determined, preferably from the override mechanism 118, whether the driver is attempting to override the ODA system 102, described further below. If it is determined in step 182 that the driver is attempting to override the ODA system 102, then the method proceeds with the ODA System 102's return to the No Action 152 state and the method begins again—otherwise, it is determined in step 184 whether an obstacle 106 is still present. If it is determined in step 184 that an obstacle 106 is no longer present, then the method proceeds with the ODA System 102's return to the No Action 152 state and the method begins again—otherwise, the method returns to step 176.

If it is determined in step 176 that the Distance is less than or equal to the Warning 2 threshold, then the ODA system 102 proceeds to the above-described Warning 2 state 156, in which the Warning 2 state 156 warning is provided, preferably by the audio alert generator 120 and/or the visual alert generator 122 via instructions provided by the processor 128. Then, in step 186, it is determined whether the driver is attempting to override the ODA system 102. If it is determined in step 186 that the driver is attempting to override the ODA system 102, then the method proceeds with the ODA System 102's return to the No Action 152 state and the method begins again—otherwise, it is determined in step 188 whether an obstacle 106 is still present. If it is determined in step 188 that an obstacle 106 is no longer present, then the method proceeds with the ODA System 102's return to the No Action 152 state and the method begins again—otherwise, the method proceeds to step 190, in which the Distance is compared with a third threshold (depicted as "T3" in FIG. 5), namely the above-described Idle Throttle threshold.

If it is determined in step 190 that the Distance is greater than the Idle Throttle threshold, then, in step 192, the current value of the Distance is compared with the Warning 2 threshold. If it is determined in step 192 that the current Distance is greater than the Warning 2 threshold, then the method proceeds with the ODA System 102's return to the No Action 152 state and the method begins again—otherwise, the method returns to step 186.

Alternatively, if it is determined in step 190 that the Distance is less than or equal to the Idle Throttle threshold, then the ODA system 102 proceeds to the above-described Idle Throttle state 158, in which the throttle is idled by the throttle module 130 to reduce the engine torque, and the Warning 2 state 156 warning is preferably continued. Then, in step 194, it is determined whether the driver is attempting to override the ODA system 102. If it is determined in step 194 that the driver is attempting to override the ODA system 102, then the method proceeds with the ODA System 102's return to the No Action 152 state and the method begins again—otherwise, it is determined in step 196 whether an obstacle 106 is still present. If it is determined in step 196 that an obstacle 106 is no longer present, then the method proceeds with the ODA System 102's return to the No Action 152 state and the method begins again—otherwise, the method proceeds to step 198, in which the Distance is compared with a fourth threshold, namely the above-described Apply Brakes threshold.

If it is determined in step 198 that the Distance is greater than the Apply Brakes threshold, then the method returns to step 190, in which the current value of the Distance is compared with the Idle Throttle threshold. Alternatively, if it is determined in step 198 that the Distance is less than or equal to the Apply Brakes threshold, then the ODA system 102 proceeds to the above-described Apply Brakes state 160, in which the throttle is idled and automatic braking is applied by the brake module 132 to stop the vehicle 100, and preferably the Warning 2 state 156 warning continues.

Next, in step 200, it is determined whether the driver is attempting to override the ODA system 102. If it is determined in step 200 that the driver is attempting to override the ODA system 102, then the method proceeds with the ODA System 102's return to the No Action 152 state and the method begins again—otherwise, it is determined in step 202 whether an obstacle 106 is still present. If it is determined in step 202 that an obstacle 106 is no longer present, then the method proceeds with the ODA System 102's return to the No Action 152 state and the method begins again—otherwise, the method proceeds to step 204, in which the current Distance is compared with the Apply Brakes threshold.

If it is determined in step 204 that the current Distance is greater than the Apply Brakes threshold, then the method again returns to step 190, in which the current value of the Distance is compared with the Idle Throttle threshold. Alternatively, if it is determined in step 204 that the current Distance is less than or equal to the Apply Brakes threshold, then the ODA system 102 proceeds to step 206, in which it is determined whether the vehicle 100 has stopped.

If it is determined in step 206 that the vehicle 100 has not stopped, then the ODA system 102 remains in the Apply Brakes state 160, and the method returns to step 200. Alternatively, if it is determined in step 206 that the vehicle 100 has stopped, then the method proceeds to the above-described Hold Vehicle state 162, in which the ODA system 102 will preferably keep the vehicle stopped and continue the Warning 2 state 156 warning. As mentioned above, it will be appreciated that this and/or other condition states may vary somewhat in other embodiments, and/or that certain condition states may be omitted or combined in certain embodiments.

Next, and preferably while in the Hold Vehicle state 162, the ODA system 102 proceeds to one or more implementations of the above-mentioned Release Control State 164, depicted in steps 208-216 of FIG. 5. In the Release Control State 164, preferably automatic braking is released and throttle control is returned to what it would be without the ODA system 102, and the ODA system 102 then returns to another condition state, depending on the determinations made in steps 208-216, as described in greater detail below.

In step 208, it is determined whether the driver is attempting to override the ODA system 102. If it is determined in step 208 that the driver is attempting to override the ODA system 102, then, in step 209, the automatic application of the brake module 132 is released, and the throttle module 130 is reengaged (or power is otherwise returned from the powertrain, as mentioned above), and the method proceeds with the ODA System 102's return to the No Action 152 state and the method begins again—otherwise, it is determined in step 210 whether an obstacle 106 is still present. If it is determined in step 210 that an obstacle 106 is no longer present, then the automatic application of the brake module 132 is released, and the throttle module 130 is reengaged (or power is otherwise returned from the powertrain, as mentioned above), and the method proceeds with the ODA System 102's return to the No Action 152 state and the method begins again—otherwise, the method proceeds to step 212, in which the current Distance is compared with the Warning 2 threshold. If it is determined in step 212 that the current Distance is greater than the Warning 2 threshold, then the automatic application of the brake module 132 is released, and the throttle module 130 is reengaged (or power is otherwise returned from the powertrain, as mentioned above), and the method proceeds with the ODA System 102's return to the No Action 152 state and the method begins again—otherwise, the method proceeds to step 214, in which the Distance is compared with the Idle Throttle threshold. If it is determined in step 214 that the Distance is greater than the Idle Throttle threshold, then, in step 211, the automatic application of the brake module 132 is released, and the throttle module 130 is reengaged (or power is otherwise returned from the powertrain, as mentioned above), and the method proceeds with the ODA system 102's return to the Warning 2 state 156, followed by step 186—otherwise, the method proceeds to step 216, in which the Distance is compared with the Apply Brakes threshold. If it is determined in step 216 that the Distance is greater than the Apply Brakes threshold, then, in step 213, the automatic application of the brake module 132 is released, and the method proceeds with the ODA system 102's return to the Idle Throttle state 158, followed by step 194—otherwise, the method proceeds with the ODA system 102's return to the Apply Brakes state 160, followed by step 200.

As mentioned above, certain steps of the processing method 150 may take certain variations based upon the type of vehicle 100 for which the processing method 150 is implemented. Similarly, it will be appreciated that the processing method 150 can likewise be applied to conventional, diesel, hybrid, and/or any of numerous different types of vehicles 100, with corresponding variations to certain steps of the processing method 150.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for detecting and avoiding an obstacle using a system of a vehicle, the vehicle including a powertrain and brakes, the method comprising the steps of:
   detecting a distance between the obstacle and the vehicle;
   reducing power from the powertrain when the distance between the obstacle and the vehicle is less than a first threshold, the first threshold being a function of a speed of the vehicle;
   applying the brakes when the distance between the obstacle and the vehicle is less than a second threshold;
   determining whether an override of the system has been initiated;
   disabling the reduction of power from the powertrain and the application of the brakes if it is determined that the override has been initiated; and
   generating a warning when the distance between the obstacle and the vehicle is less than a third threshold.

2. The method of claim 1, wherein determining whether the override has been initiated comprises determining whether a driver of the vehicle is requesting application of the brakes.

3. The method of claim 1, wherein the vehicle includes an accelerator pedal, and determining whether the override has been initiated comprises determining whether a driver of the vehicle is applying the accelerator pedal.

4. A system of a vehicle for detecting and avoiding an obstacle, the vehicle having a powertrain and brakes, the system comprising:
   an obstacle detector coupled to the vehicle and configured to detect a distance between the obstacle and the vehicle;
   an action generator configured to reduce power from the power train, apply the brakes, and generate a warning;
   an override mechanism configured to at least facilitate determining whether an override of the system has been initiated; and
   a processor coupled to the obstacle detector, the action generator, and the override mechanism, the processor configured to (i) command the action generator to reduce the power from the powertrain when the distance between the obstacle and the vehicle detected by the obstacle detector is less than a first threshold, the first threshold being a function of a speed of the vehicle, (ii) command the action generator to apply the brakes when the distance between the obstacle and the vehicle detected by the obstacle detector is less than a second threshold; (iii) disable the reduction of power from the power train and the application of the brakes if it is determined that the override has been initiated; and (iv) command the action generator to generate the warning when the distance between the obstacle and the vehicle is less than a third threshold.

5. The system of claim 4, wherein determining whether the override has been initiated comprises determining whether a driver of the vehicle is requesting application of the brakes.

6. The system of claim 4, wherein the vehicle has an accelerator pedal, and determining whether the override has been initiated comprises determining whether a driver of the vehicle is applying the accelerator pedal.

* * * * *